United States Patent [19]
Coutin

[11] Patent Number: 4,706,541
[45] Date of Patent: Nov. 17, 1987

[54] DEVICE FOR RETAINING AND RELEASING A WIRE FOR ARMING BOMB FUSES

[75] Inventor: Pierre F. Coutin, Paris, France

[73] Assignee: R. Alkan & Cie

[21] Appl. No.: 16,912

[22] Filed: Feb. 20, 1987

Related U.S. Application Data

[63] Continuation-in-part of Ser. No. 727,041, Apr. 25, 1985, abandoned.

[30] Foreign Application Priority Data

Apr. 27, 1984 [FR] France ................. 84 06716

[51] Int. Cl.[4] .................. F41F 5/02; B64D 1/04
[52] U.S. Cl. ................... 89/1.55; 294/82.3; 294/82.33; 294/82.35
[58] Field of Search ................ 89/1.55; 294/82.31–82.35, 82.3

[56] References Cited

U.S. PATENT DOCUMENTS

| | | | |
|---|---|---|---|
| 1,893,232 | 1/1933 | Halsey | 89/1.55 |
| 2,922,340 | 1/1960 | Wilkie | 89/1.55 |
| 3,285,132 | 11/1966 | McCurdy | 89/1.55 |
| 3,807,784 | 4/1974 | Laky | 294/82.33 |
| 3,831,486 | 8/1974 | Yost | 89/1.55 |
| 4,088,055 | 5/1978 | West et al. | 89/1.55 |
| 4,118,060 | 10/1978 | Brown | 294/82.3 |
| 4,212,225 | 7/1980 | Correll et al. | 89/1.55 |
| 4,266,462 | 5/1981 | Carter et al. | 294/82.35 X |
| 4,453,622 | 6/1984 | Betz | 294/82.35 X |
| 4,520,711 | 6/1985 | Robinson | 89/1.55 |

Primary Examiner—David H. Brown
Attorney, Agent, or Firm—William A. Drucker

[57] ABSTRACT

A device for retaining and releasing a wire ensuring the arming of bomb fuses comprising a practically rectilinear lever pivoting on a fixed pin and ensuring the kinematic connection between a finger and retaining the ring of the arming wire by a pivot pin, a snap hook of the device by means of a roller of the lever and the tripping mechanism of the bomb tripping means by another roller of the lever opposite a retractable element of said mechanism.

4 Claims, 9 Drawing Figures

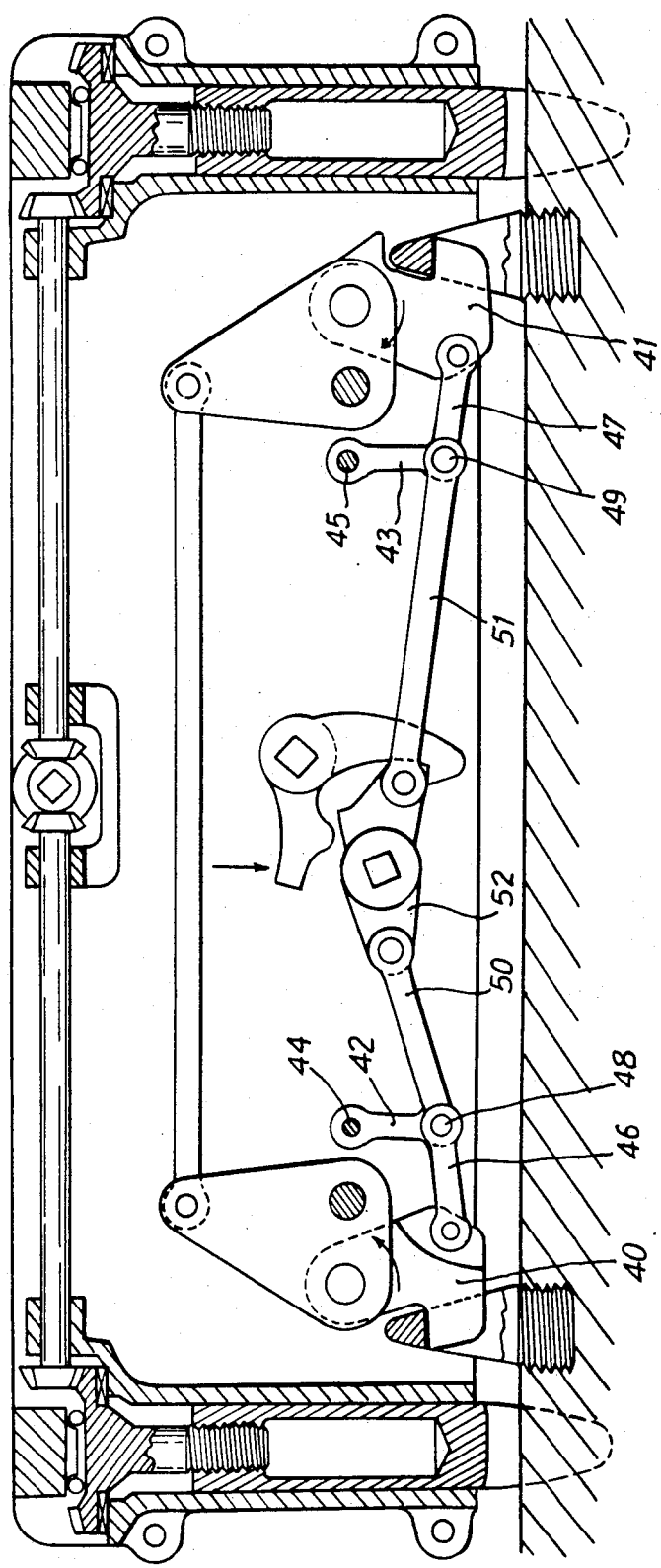

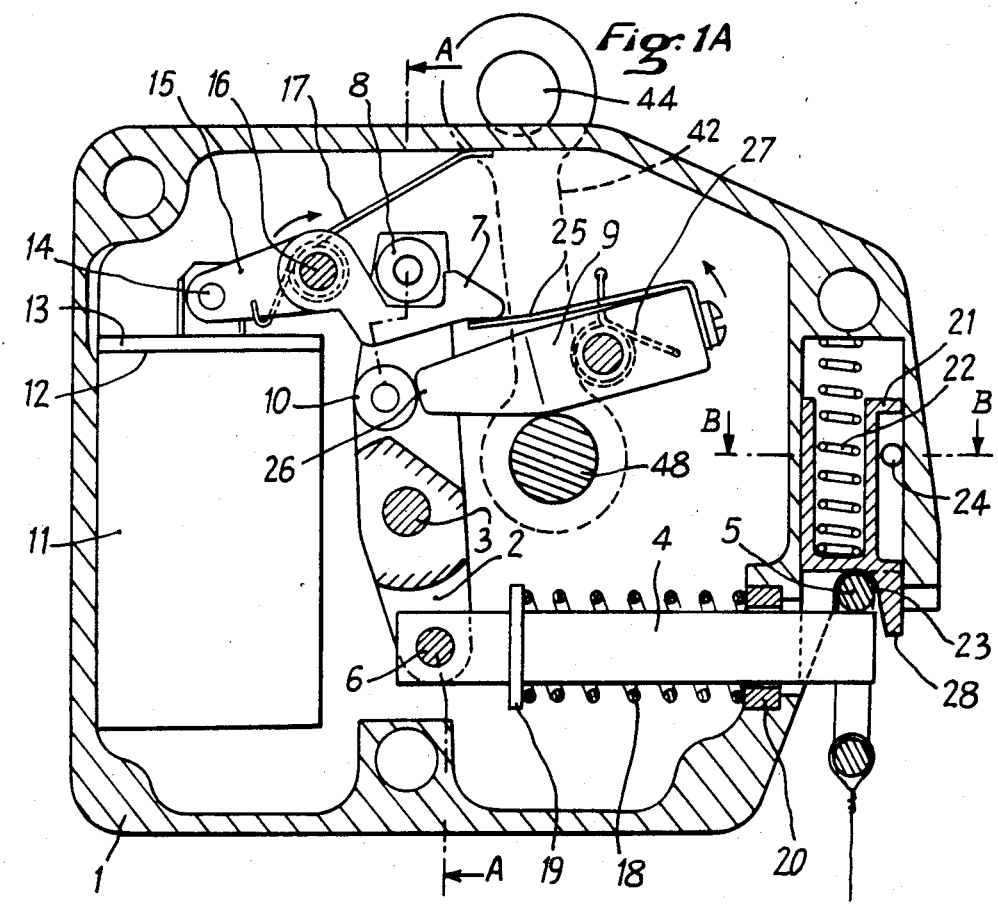
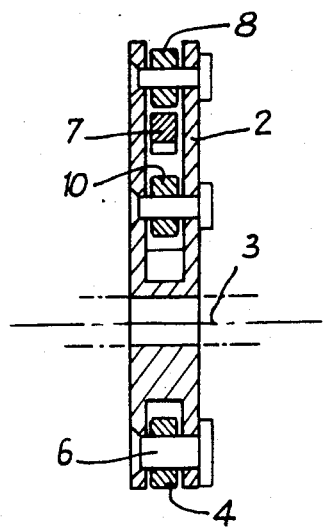
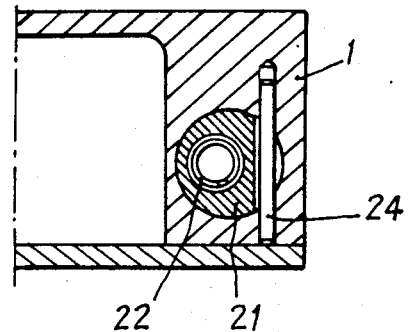

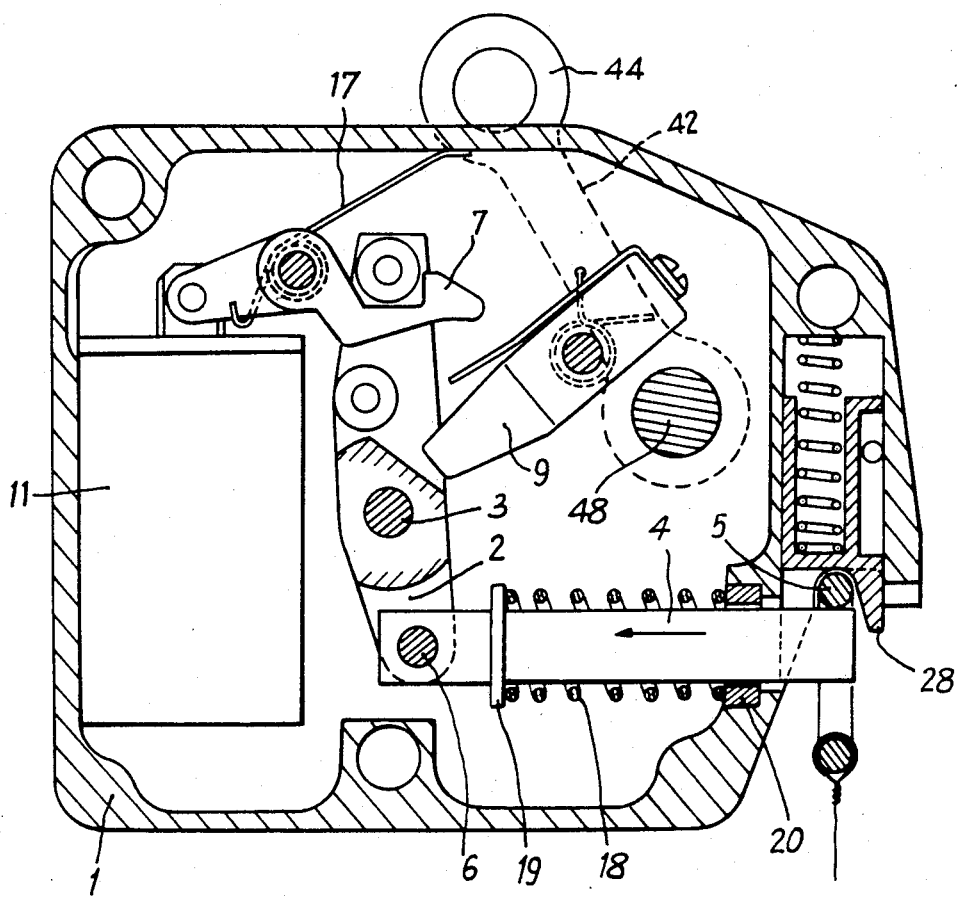

DEVICE FOR RETAINING AND RELEASING A WIRE FOR ARMING BOMB FUSES

This is a continuation-in-part application of my co-pending application Ser. No. 727,041 filed on Apr. 25, 1985, now abandoned.

BACKGROUND OF THE INVENTION

Some projectiles, and aviation bombs in particular, comprise firing fuses. The arming of these fuses is generally provided by ripping a safety wire. This wire ends in a ring retained by an auxiliary tripping device completing the main bomb release device.

During release of the bomb, this electrically controlled auxiliary tripping means is called on either to retain the ring and thus cause the corresponding fuse to be armed or to free the ring in the case of inert firing of the bomb. Before the bomb is released it must be possible to pass from active firing to inert firing and conversely without the ring being freed. Depending on the conditions imposed by the user, the auxiliary tripping means must retain the ring after active firing or on the contrary let it go after the fuse has been armed and the power supply cut off.

The device of the present invention belongs to this second category. In addition, the ring is positioned after the bomb has been coupled up and it is ejected in the case of inert firing or after the bomb has been armed and the current cut off.

SUMMARY OF THE INVENTION

In this device, a particular arrangement of its parts prevents practically any untimely tripping due to the accelerations or vibrations usually occurring on board an aircraft.

This arrangement comprises a practically rectilinear lever pivoting on a fixed pin and designed to play several roles while ensuring the kinematic connection between a ring retaining finger pivotably mounted on the lever for retaining a ring, a snap hook of the device cooperating with a roller of the lever and the tripping mechanism of the bomb tripping means cooperating with another roller of the lever provided opposite a rectractable part of said mechanism.

BRIEF DESCRIPTION OF THE DRAWINGS

One embodiment of the invention will be described hereafter with reference to the accompanying drawings in which:

FIG. 1 is a longitudinal section of the device for suspending loads under aircraft as already described in U.S. Pat. No. 4,318,561, particularly showing the main bomb tripping mechanism;

FIG. 1A shows the device of the invention in the waiting position, the main bomb tripping mechanism being set (closed hooks);

FIG. 2 is a section of the main lever along line A—A of FIG. 1A showing this lever in profile;

FIG. 3 is a section of the ejection device through line B—B of FIG. 1A;

FIG. 4 shows the device immobilized by the electromagnet of the auxiliary tripping means (active firing), the main bomb tripping mechanism being tripped (bomb released);

DESCRIPTION OF THE PREFERRED EMBODIMENT

Figure 5:
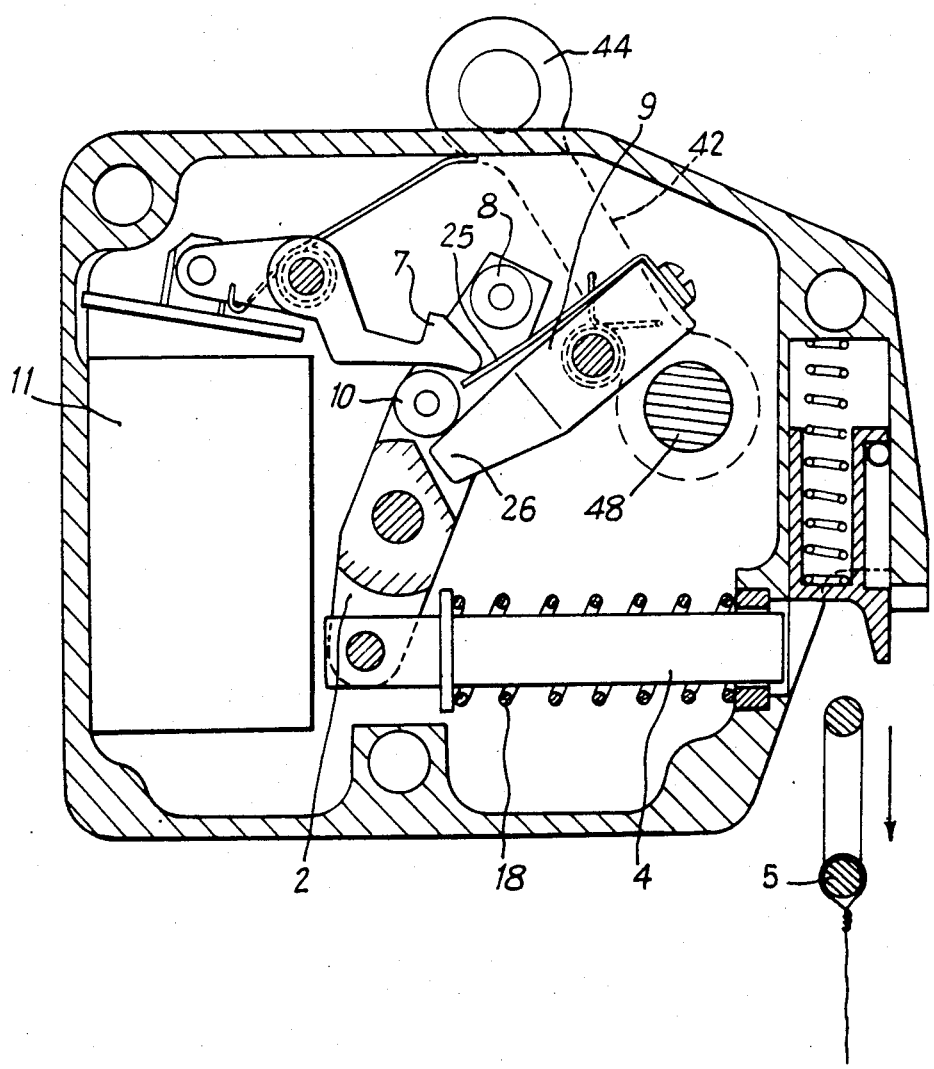
FIG. 5 shows the device in the position for releasing and ejecting the ring (electric supply of the electromagnet cut off), the main bomb tripping means being tripped (bomb released)

In FIG. 1 is shown the known load suspension device, as already known from U.S. Pat. No. 4,318,561, with pivoting suspension hooks 40,41 which have their opening and closing movements controlled through a main tripping mechanism comprising arms 42,43 rotatably mounted about fixed pivot members 44,45 and to which the suspension hooks 40,41 are connected via links 46,47. At the ends 48,49 of arms 42,43, connecting rods 50,51 are pivotally connected at one end, the opposite ends thereof being pivotally connected to a common rocker 52.

In FIG. 1A, at 1 is shown the casing closing the device of the invention, at 2 the main lever pivotally mounted on the fixed pin 3 and in connection both with the ring retaining finger 4 through the pivot pin 6 and with the retaining hook 7 through a roller 8 carried by lever 2 and finally, through another roller 10, with a pivoted element 9 adapted to co-act with the end 48 of arm 42 of the main tripping mechanism, this end 48 paning through a slot (not shown) provided in casing 1.

At 11 is shown a screened electromagnet without mobile piece whose upper edge 12 holds applied thereto, when it is supplied with power, a soft iron disk 13 mounted for pivoting at 14 on the tail end 15 of the retaining hook 7, which may pivot about the fixed pin 16. The disk and hook assembly is urged in the direction of the arrow by a spring 17 tending to open the hook 7.

At 18 is shown a coil spring which tends to cause retraction of finger 4 by bearing on the one hand on the collar 19 of finger 4 and on the other on the slightly flared bearing surface 20 for aligning finger 4 with the pivot pin 6 of lever 2.

At 21, has been shown a sliding cylindrical piece urged downwardly by a spring 22. This piece, when it is raised, allows ring 5 to be fitted into the recess 23 formed in housing 1 and ejects the ring when the finger 4 is withdrawn by tripping of lever 2. A pin 24 limits the ejection travel of piece 21 and prevents it from rotating.

On element 9 which co-acts with part 48 of the main tripping mechanism there is provided at 25 a resilient piece (blade spring for example) which acts on the retaining hook 7 for applying disk 13 without a high accuracy being required in the relative positions and for allowing the end 26 of element 9 to bring lever 2 into position and to hold it in position by means of roller 10.

A spring 27 urges element 9 to retract in the direction of the arrow. This element is actuated by the mechanism of the main tripping means and, when it is retracted, is is not engaged with the device and cannot communicate the possible shocks or bouncing of the main tripping means.

The operation of the device is as described above.

Normally, the bomb is positioned by the usual means and the hooks of the tripping means are therefore in the closed position, the device then being in the position shown in FIG. 1A. After positioning the bomb, ring 5 is introduced into recess 23 while causing it to raise piece 21 by its nose 28 against the action of spring 22. Ring 5 is then retained by finger 4.

If the firing is to be active, the electromagnet 11 is supplied with power, which results in holding hook 7 in the hooked position with respect to roller 8 of the main lever 2, which is immobilized although element 9 of the main tripping mechanism is retracted by spring 27 and occupies the position shown in FIG. 4. The finger 4 retains the ring so that the safety wire mentioned above is ripped.

It will be noted that the pull exerted on the ring causes reactions on finger 4 at the level of bearing surface 20 and of pivot pin 6. The reaction on pin 6 is directed upwardly by the fixed pin 3 through lever 2 which is subjected to a slight rotational moment tending to improve the snap fit on hook 7. If the pull on the ring is not exerted exactly in a vertical plane, the lateral reactions are absorbed by collar 19 bearing laterally against the walls of case 1.

When the power supply to electromagnet 11 is cut off, spring 17 causes hook 7 to rotate about its pin 16 in the direction of the arrow. Lever 2, thus released is subjected to the action of spring 18, finger 4 moves in the direction of the arrow of FIG. 4 and ring 5 is released. The device then assumes the position shown in FIG. 5.

If the firing is to be inert, the electromagnet 11 is not fed with power, and the main tripping means urges element 9 into the position shown in FIG. 5. Since the main lever 2 is not retained, spring 18 causes finger 4 to retract and ring 5 is released at the moment of firing. The safety wire is not ripped.

It should be noted that, as long as the main tripping means is not tripped, element 9 remains in position and holds the main lever 2 in position. Thus active firing or inert firing may be envisaged at any moment before the bomb is released without any part moving. After firing, the device is finally in the position shown in FIG. 5.

Resetting of the main tripping means (hooks closed) causes element 9 to be replaced in position whose end 26 acting on roller 10 brings the main lever 2 back to the position shown in FIG. 1. Moreover, the blade spring 25 fixed on element 9 forces the hook 7 in complete engagement with roller 8. All the parts are then in the waiting position as shown in FIG. 1.

Figure 7:
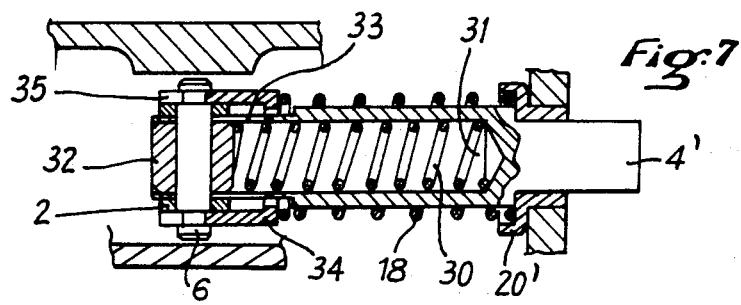
FIG. 7 shows, in section through C—C of FIG. 6, a detail of the connection of the ring retaining finger with the end of the main lever.
Figure 8:
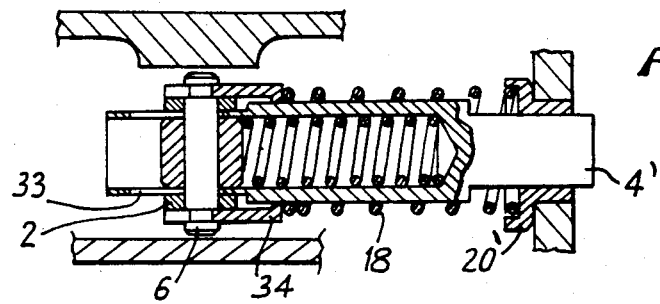
FIG. 8 shows, in the same section through C—C, the ring retaining finger pushed into the retracted position.

It may happen that members prevent the ring from being ejected which must then be freed laterally in an unaccustomed way. Since the space required for parts 21, 22, 23 and 24 is no longer justified, for positioning the ring in recess 23, a resilient retraction of finger 4' (FIGS. 6 to 8) has been designed. The spring 18 then acts between the bearing surface 20' and the U shaped piece 34 which caps lever 2 and whose legs have notches 35 housed in corresponding grooves provided at the ends of pin 6. Spring 18 then acts on pin 6, i.e. on lever 2, independently of finger 4'.

By providing oblong holes 33, finger 4' may then retract with respect to notch 23 without modifying the position of lever 2. This retraction is limited by the length of the oblong hole 33. In finger 4' a bore 31 has been provided in which a spring 30 acts between the bottom of the bore 31 and the plug 32 through which pin 6 passes.

Figure 6:
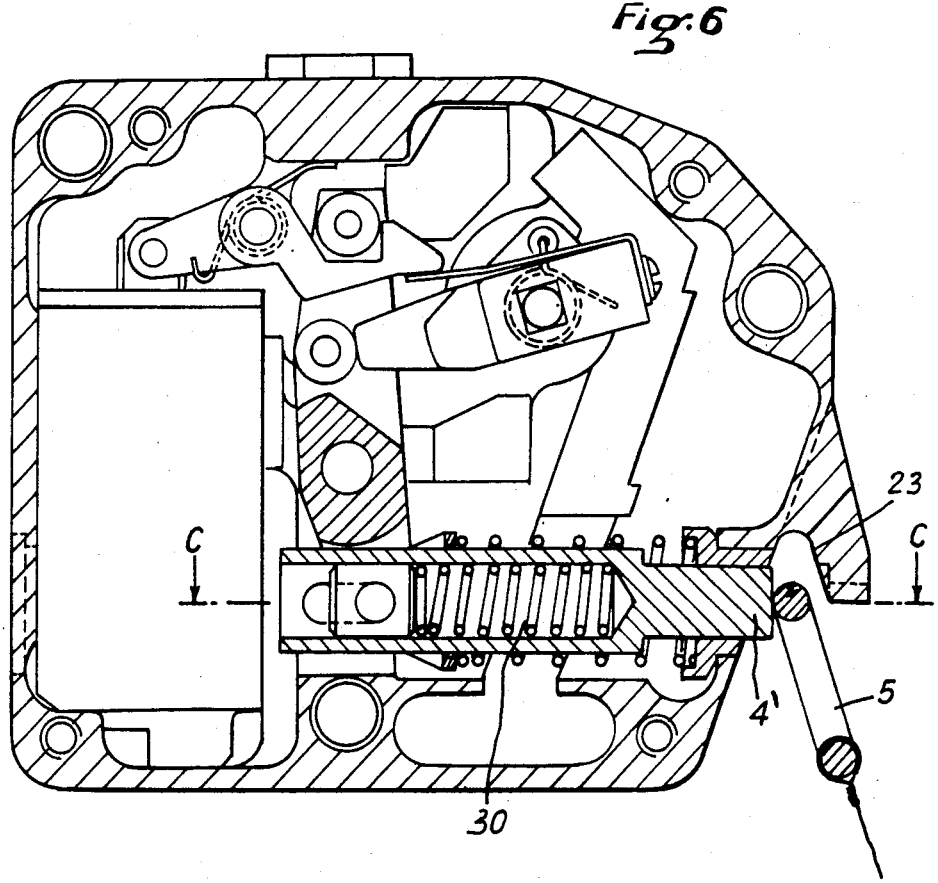
FIG. 6 shows a device which is similar to that of FIG. 1A to a large extent but in which, in the set position of the lever, the finger retaining the ring may be pushed resiliently for inserting this ring in the retained position.

On positioning ring 5, this latter is engaged on the end of finger 4', which results in bringing this finger into the position shown in FIG. 6 while compressing spring 30. As soon as ring 5 is in notch 23, the finger 4' resumes its initial position.

The operation of the device is otherwise not at all changed.

What I claim is:

1. Device for retaining and releasing the end ring of a safety wire which, when tripped, ensures setting of bomb fuses, this device comprising:
   a practically rectilinear lever pivoting on a fixed pin;
   a retaining finger pivoted at one end of said lever and co-acting with a recess for retaining the end ring of the safety wire, said retaining finger being urged by a first spring in a direction allowing said ring to be freed;
   a snap hook co-acting with a roller provided at the other end of said lever and connected to an electromagnet; and
   a retractable element depending of a bomb tripping mechanism, said element in a working position co-acting with a roller provided on an intermediate part of said lever.

2. The device as claimed in claim 1 wherein, for ejecting said ring in the case of inert firing, a cylindrical piston is provided which is slidably mounted within said recess and is limited in its travel by a tangential pin.

3. The device as claimed in claim 1 wherein, to make possible the positioning of said ring, a second spring is provided inside said finger, said second spring bearing on the one hand in the bottom of a bore in the finger and on the other hand, through a plug, on a movable pivot pin carried by said lever, this assembly then allowing resilient retraction of the finger by means of slits in this finger through which the pivot pin passes.

4. The device as claimed in claim 3, wherein said first spring is disposed outside the finger and bears on said movable pivot pin through a U-shaped piece capping said lever and whose legs have notches housed in the grooves provided on said movable pivot pin.

* * * * *